US012808820B2

(12) United States Patent
Schildroth et al.

(10) Patent No.: US 12,808,820 B2
(45) Date of Patent: Nov. 24, 2026

(54) PHASED ANTENNA ARRAY FOR DETECTION OF CROP, PLANT AND SOIL CHARACTERISTICS AND MEASUREMENT AND MODELING OF PLANT FEATURES AND OTHER ITEMS OF AGRICULTURAL INTEREST

(71) Applicant: MACH, INC., Ely, IA (US)

(72) Inventors: Rhett W. Schildroth, North Liberty, IA (US); Colin Josh Hurd, Ames, IA (US)

(73) Assignee: MACH, INC., Ely, IA (US)

( * ) Notice: Subject to any disclaimer, the term of this patent is extended or adjusted under 35 U.S.C. 154(b) by 91 days.

(21) Appl. No.: 18/641,345

(22) Filed: Apr. 20, 2024

(65) Prior Publication Data

US 2026/0071973 A1 Mar. 12, 2026

Related U.S. Application Data

(60) Provisional application No. 63/461,000, filed on Apr. 21, 2023.

(51) Int. Cl.

| | |
|---|---|
| ***G01N 22/00*** | (2006.01) |
| ***A01B 79/00*** | (2006.01) |
| ***G01C 21/16*** | (2006.01) |
| ***H01Q 3/36*** | (2006.01) |

(52) U.S. Cl.

CPC ........... *G01N 22/00* (2013.01); *A01B 79/005* (2013.01); *G01C 21/16* (2013.01); *H01Q 3/36* (2013.01)

(58) Field of Classification Search

CPC ...... G01N 22/00; A01B 79/005; G01C 21/16; H01Q 3/36

USPC .......................................................... 701/50

See application file for complete search history.

(56) References Cited

U.S. PATENT DOCUMENTS

| | | | | |
|---|---|---|---|---|
| 6,791,488 | B2 | 9/2004 | Diekhans et al. | |
| 6,826,894 | B2 | 12/2004 | Thiemann et al. | |
| 9,479,232 | B1 * | 10/2016 | Loui | H04B 7/0617 |
| 9,518,753 | B2 | 12/2016 | Mewes et al. | |
| 9,563,848 | B1 | 2/2017 | Hunt | |

(Continued)

FOREIGN PATENT DOCUMENTS

| | | | |
|---|---|---|---|
| DE | 10035768 | A1 | 1/2002 |
| DE | 19742463 | B4 | 6/2007 |

(Continued)

OTHER PUBLICATIONS

Patent Cooperation Treaty, International Searching Authority, International Search Report, PCT/US2024/025601.

(Continued)

*Primary Examiner* — Isaac G Smith
(74) *Attorney, Agent, or Firm* — LAZARIS IP, INC.

(57) ABSTRACT

A phased antenna array radar enables particular data capture for determining attributes of agricultural features, properties, and other items of interest, from detected crop, plant and soil characteristics. This information is processed to produce estimated or actual crop yield and other agricultural outputs, and to enable automatic position, control, operation, and adjustment of agricultural machinery and associated implements. Data captured by the phased antenna arrays may also be combined with other data detection systems such as image, sonic, Lidar, frequency modulated continuous wave radar, or other sensors for additional accuracy.

30 Claims, 5 Drawing Sheets

(56) References Cited

U.S. PATENT DOCUMENTS

| | | | | |
|---|---|---|---|---|
| 9,792,557 | B2 | 10/2017 | Mathur et al. | |
| 9,807,938 | B2 | 11/2017 | Wilken et al. | |
| 10,255,391 | B2 | 4/2019 | Mewes et al. | |
| 10,359,514 | B2 | 7/2019 | Hagerman et al. | |
| 10,649,067 | B1 * | 5/2020 | Yang | G01S 7/038 |
| 2011/0309972 | A1 * | 12/2011 | Lok | G01S 7/023 342/161 |
| 2014/0062762 | A1 * | 3/2014 | Kurono | G01S 7/354 342/146 |
| 2018/0188366 | A1 * | 7/2018 | Kemmer | A01F 15/0825 |
| 2020/0196527 | A1 * | 6/2020 | Ferrari | A01D 41/1278 |
| 2022/0053692 | A1 | 2/2022 | Fischer et al. | |
| 2023/0045992 | A1 | 2/2023 | Wieckhorst et al. | |
| 2023/0053142 | A1 | 2/2023 | Birkmann et al. | |
| 2023/0176184 | A1 * | 6/2023 | Emadi | G01S 7/4026 342/174 |

FOREIGN PATENT DOCUMENTS

| | | | |
|---|---|---|---|
| DE | 102014014049 | A1 | 3/2016 |
| DE | 102014116059 | A1 | 5/2016 |
| DE | 102015122305 | A1 | 6/2017 |
| DE | 19648126 | B4 | 1/2019 |
| DE | 102018102361 | A1 | 8/2019 |
| DE | 102019004647 | A1 | 1/2021 |
| DE | 102019121052 | A1 | 2/2021 |
| DE | 102020112230 | A1 | 11/2021 |
| DE | 102022110967 | A1 | 11/2021 |
| DE | 102021110161 | A1 | 10/2022 |
| EP | 1219158 | B1 | 1/2007 |
| EP | 1825734 | B1 | 6/2014 |
| EP | 3195719 | B1 | 7/2017 |
| EP | 3569049 | B1 | 11/2019 |
| EP | 3837959 | A1 | 6/2021 |
| EP | 3489632 | B1 | 7/2021 |
| EP | 3847878 | A1 | 7/2021 |
| EP | 3901588 | A1 | 10/2021 |
| EP | 3300580 | B2 | 4/2022 |
| EP | 4248730 | A2 | 9/2023 |
| EP | 4270135 | A1 | 11/2023 |
| WO | WO 2021015886 | A1 | 1/2021 |
| WO | WO 2022232914 | A1 | 11/2022 |

OTHER PUBLICATIONS

Patent Cooperation Treaty, International Searching Authority, Written Opinion of the International Searching Authority, PCT/US2024/025601.

Abdul Salam; Design of Subsurface Phased Array Antennas for Digitial Agriculture Applications; EEE International Symposium on Phased Array System & Technology; Oct. 15-18, 2019.

Oumaima B. Soultane; Smart Agricultural Optimization: Integrating Edge Computing and Ai for Enhanced Crop; 10th Int'l Conference on Applied System Innovation; Apr. 17-21, 2024.

* cited by examiner

PHASED ANTENNA ARRAY FOR DETECTION OF CROP, PLANT AND SOIL CHARACTERISTICS AND MEASUREMENT AND MODELING OF PLANT FEATURES AND OTHER ITEMS OF AGRICULTURAL INTEREST

CROSS-REFERENCE TO RELATED PATENT APPLICATION(S)

This patent application claims priority to U.S. provisional patent application 63/461,000, filed on Apr. 21, 2023, the contents of which are incorporated in its entirety herein. In accordance with 37 C. F. R. § 1.76, a claim of priority is included in an Application Data Sheet filed concurrently herewith.

FIELD OF THE INVENTION

The present invention relates to the field of precision agriculture. Specifically, the present invention relates to detection and modeling of attributes such as crop, plant and soil features and other items of agricultural interest, using data collected from hardware systems that at least include a radar-based sensor system comprised of a phased antenna array, to generate multiple agricultural outputs.

BACKGROUND OF THE INVENTION

Humans have long sought to evaluate and optimize crop, plant and soil performance and determine agricultural outcomes such as estimated or actual crop yield by observing plant features and other agricultural characteristics during a growing season. Similarly, it has long been common practice to monitor and attend to soils both within and outside of growing seasons. Many modern approaches for automating such processes exist, and utilize different techniques, such as analyzing information from vision-based detection systems, as well as ranging systems such as radar and Lidar, satellite-based multi-spectral sensing systems, and acoustic sensing systems.

Current practices for automating machine detection of plant features and other agricultural characteristics to generate outcomes such as an estimated or actual yield primarily utilize visual light image sensors (such as cameras). These sensors however are inaccurate, due to several limitations. For example, obtaining a satisfactory image of the plant is often difficult due to the part of the plant being measured being occluded by leaves, weeds, or other plants and things that either cover or obscure the item of interest or are between the image sensor and the item of interest. Still further, there must be enough illumination present for images accurate enough to perform processing. Other occurrences such as precipitation, fog, dust and other moisture may also negatively impact image quality. Vision-based systems alone are therefore not enough at least due to the possibility of obstructions and other issues affecting visibility.

Use of traditional, single-point radar alone also has limitations for generating estimate or actual yield, and other applications in agriculture. Such a radar system is not accurate enough to account for variations in characteristics such as plant or crop moisture, an amount of leaves, and other variables that negatively impact the signal received. In other words, as with vision-based systems, ground truth characteristics can restrict the quality of information to be derived from the use of single-point radar.

Other sensing techniques include using multispectral images captured by sensors associated with satellites and other high-altitude machines. One limitation of this type of sensor is that multiple plant and environmental characteristics may be present in the sensor reading, making it difficult to isolate the characteristic of interest. Acoustic sensors, such as those that capture sonic or sonar waves, are also not accurate enough by themselves due to variations in the signal response from, for example, differences in vegetation density, angles of reflection.

Existing systems therefore do not provide accurate or complete measurements and will not be useful in most applications. Accordingly, there is a need in the art for improved systems and methods for accurately measuring attributes such as plant features and other items of interest, and to improve the corresponding accuracy of estimated or actual yield and other outputs. There is an additional need in the art for data modeling that utilizes unique attributes of measurements taken in such systems and methods for analyzing specific aspects of crops, plants, and soils. There is a further need in the art for corresponding increases in accuracy of outputs of such data modeling, to generate improvements in analyzing estimated or actual crop yield, and a further need in the art for utilizing outputs of such data modeling for improvements in positioning, actuating, and adjusting agricultural machinery, and implements configured with such machinery, whether fully or partially autonomously operated or otherwise, to perform particular agricultural activities. There is still a further need in the art for providing more accurate information to users of such machinery based on detection of plant, crop, and soil characteristics and measurements of attributes such as plant features and other items of interest.

Examples of applications where improvements in the art of measuring crop, plant and soil characteristics may be beneficial include tilling, which is a process used to prepare farmland for crop planting. A tillage machine is used to mechanically destroy weeds and spent crops, mix organic matter into the soil, aerate the soil, and improve other soil qualities before planting the next phase of crops. Soil tilth is a vital parameter for the efficacy and eventual yield of crops. Soil roughness after tilling can be measured in a variety of ways, including UAV-mounted RGB cameras or laser mapping of the surface to determine the quality of the tillage before planting crops. Most methods for determining tillage quality are either susceptible to dust or require human intervention and measurement, which prevents them from being used during the tilling process. This leads to the possibility that the tilling process must be repeated if the tillage quality is substandard. Because tillage is a labor-intensive and expensive process, it is beneficial to determine the tillage quality during the process, allowing an operator to make real-time adjustments to the tillage equipment and maximize tillage job quality.

BRIEF SUMMARY OF THE INVENTION

The challenges outlined above for detection plant, crop, and soil characteristics and measurement of agricultural attributes may be overcome using a radar system having a phased antenna array. In the present invention, data collected from sensor readings taken from such a phased antenna array are utilized to examine items of interest, in a modeling framework that analyzes one or more crop, plant and soil characteristics obtained from such sensor readings. Such a phased antenna array may be used either alone or in conjunction with other sensors, such as a single camera, stereo camera, multiple cameras, Lidar, and acoustic sensors, as well as other radar-based sensors such as frequency-modulated continuous wave (FMCW) radar systems, to further increase detection accuracy.

The approach of the present invention utilizes unique aspects of sensor measurements from phased antenna arrays to model attributes such as a physical shape of an agricultural item, the properties of the agricultural item, and others. Output data regarding these attributes is then applied to generate an estimated or actual crop yield, and to actuate agricultural implements such as irrigation, fertilization, pruning, and harvesting equipment. The modeling framework may include one or more aspects of machine learning that are applied to further analyze sensor readings and improve predictions of estimated or actual crop yield.

Phased array radar technology leverages an assembly of individual antenna elements. Each antenna element within the array can be independently controlled, allowing for meticulous adjustments in the phase of emitted signals. This capability enables the fine-tuning of the radar's overall beam direction and characteristics, facilitating detailed observations of soil structure, vegetation, crops and other items of interest. By utilizing longer waveform frequencies and manipulating the radar beam, phased array radar systems can penetrate vegetation and provide high resolution returns, generating critical data on soil tillage effectiveness and optimizing yield estimations. This advanced radar technology thus has the potential to significantly enhance automated decision-making processes in precision agriculture. For example the data may allow automatic adjustment of tillage depth and angle to target an optimal amount of residue coverage or provide a forecast measurement of crop mass to enter a harvester. Furthermore, due to the penetrating properties of the radar signal, it may be possible to detect obfuscated debris in tall grass or limited visibility environments.

The framework of the present invention utilizes an active phased antenna array to achieve a signal to noise ratio when measuring a distance to an object of interest that is superior to that of other types of single-point or single-beam radar systems. By adjusting the phase and amplitude of signals emitted by each antenna element in the phased antenna array, the beam's direction and characteristics are able to be precisely controlled. The active phased antenna array may be deployed in different approaches for measuring the distance to an object of interest. In a phased array antenna, power from a transmitter is provided to radiating elements through devices called phase shifters, which are controlled by a computer system to alter either the phase or signal delay electronically, to steer the beams of radio waves in different directions.

In one such approach, a beamforming operation utilizes analog phase shifters, both for transmitting and receiving means of radio frequency waves. Analog phase shifters adjust a phase angle of the beams from the antennas (typically by adjusting a voltage level). In an alternative approach, a beamforming operation utilizes true time delay units for each antenna. Phase shifters in this alternative approach perform time delay functions such as true time delay units.

Regardless of the approach utilized, beamforming using phased antenna arrays allows for a concentration of RF energy in a desired direction, which enables determination of different features of the environment, or correction for installation error without mechanical motion. An array of antennas offers more flexibility in what is being measured, and offers more directivity than a single antenna, thereby resulting in more accuracy and resolution for distance/range measurements for particular use cases.

Objectives, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
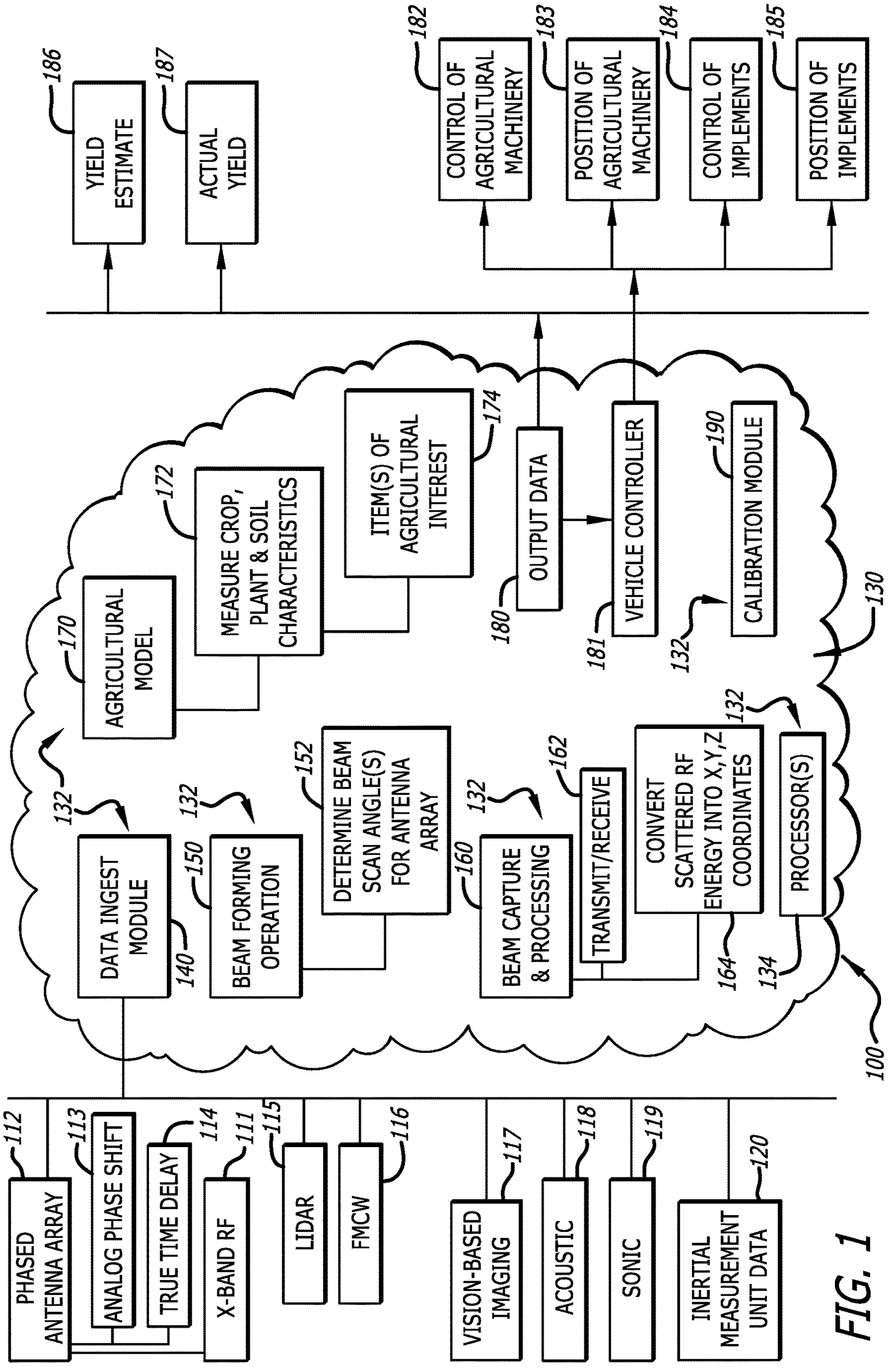
FIG. 1 is a system diagram illustrating various elements and functions of an agricultural data collection and modeling framework according to the present invention.

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

As noted throughout, the present invention contemplates the use of a radar system comprised of a phased antenna array for taking sensor readings from which input data is obtained. Such a radar system may utilize either phase-shifted beam scanning or time-shifted beam scanning, or both, for transmitting and receiving RF radio waves to a surrounding area to measure one or more crop, plant, or soil characteristics of an item(s) of agricultural interest. This application of a phased antenna array in the present invention is embodied in an agricultural data collection and modeling framework as detailed further herein. The application of phased antenna arrays for such sensor readings may be either alone (i.e., phased antenna arrays only), or may be applied in combination with other types of sensors. In one embodiment, such other sensors include other radar systems, such as frequency modulated continuous wave (FMCW) radar, where signals sent and received by such FMCW radar are neither phase-shifted nor time-shifted. In further embodiments, other sensors may further include one or more of vision or imaging systems (such as a single camera, a stereo camera, multiple cameras), acoustic or sonic sensors, light detection and ranging sensors (Lidar), and any other sensor which is capable of capturing information relating to plant features or material, and other crop, plant and soil characteristics, and from which measurements of items of interest may be derived. It is to be understood that in all embodiments of the present invention, the framework utilized may include either a phased antenna array-based radar alone, or in combination with other sensing systems.

The present invention involves measuring certain attributes of items of interest in an agricultural environment, from sensor readings that include information relating to plant features and material, and other aspects of plants, crops, and soils. These attributes may include size, shape, and properties of such items of interest, and other characteristics thereof. While there are many examples of items of interest (and attributes and characteristics thereof) expressed herein, it is to be understood that many more are also possible. The present invention is therefore not to be limited to any particular use case, attribute, or item of interest, or measurement thereof, specified herein.

The present invention also contemplates that measurements taken of attributes of items of interest may be used for a variety of purposes, and these include locating, positioning, operating, and adjusting machinery to perform various types of agricultural activities. It is further to be understood that many types of agricultural activities are contemplated. Examples of such activities include, but are not limited to, pruning, irrigation, fertilization, and harvesting. The present invention contemplates that instructions may be generated for automated actuation of machinery to accomplish and perform these activities, as well as navigation of machinery for such activities. It is to be understood that many other types of activities are possible (including approaches for operating machinery for such activities), and are within the scope of the present invention, and therefore that the present specification is not to be limited to any specific type of activity, or any specific type of machinery, specified herein.

The present invention is, as noted above, an agricultural data collection and modeling framework 100 for obtaining and modeling input data 110 to measure crop, plant and soil characteristics 172 relative to one or more items of agricultural interest 174, and analyzing such crop, plant and soil characteristics 172 to improve accuracy in deterministic outputs that drive both agricultural decision-making, and operation of agricultural machinery. FIG. 1 is an exemplary system diagram illustrating various components and functions of the agricultural data collection and modeling framework 100 according to the present invention. The agricultural data collection and modeling framework 100 includes one or more systems and methods that are used both within and outside of a growing season to analyze crop, plant and soil characteristics 172 to perform various types of agricultural activity. This crop, plant and soil characteristics 172 for the one or more items of agricultural interest 174 may be used to generate estimated or actual crop yields, and may also be used to actuate, control, position, and adjust agricultural machinery and/or implements thereof, regardless of whether such agricultural machinery is fully automated or otherwise.

The agricultural data collection and modeling framework 100 includes, in one or more aspects of the present invention, the use of artificial intelligence-based models. These models may apply techniques of machine learning, such as supervised learning and unsupervised learning, as well as one or more instantiations of neural networks to continually enhance the modeling of the input data 110 in one or more of the data processing elements 132 in the agricultural data collection and modeling framework 100, by developing and understanding relationships between various types of information. These artificial intelligence-based models may include standardized models, and may also include one or more models customized according to proprietary formulas. Regardless, the artificial intelligence-based models are comprised, at least in part, of algorithms that apply different mathematical approaches to analyzing information and generating outputs that improve outcomes of the data modeling aspects of the agricultural data collection and modeling framework 100 described herein.

The present invention is embodied within one or more systems and/or methods that are performed in a plurality of data processing elements 132, or modules, that are components within a computing environment 130 that also includes one or more processors 134 and a plurality of software and hardware components. The one or more processors 134 and plurality of software and hardware components are configured to execute program instructions or routines to perform the modules, components, and functions described herein that together comprise and are embodied within the plurality of data processing elements 132. The words "module" and "modules" as used herein, may refer to logic embodied in hardware or firmware, or to a collection of software instructions, written in a programming language, such as, for example (but not limited to), Java, C, Python, or assembly. One or more software instructions in the modules may be embedded in firmware. It will be appreciated that the modules forming the data processing elements 132 may include connected logic modules, such as gates and flip-flops, and may include programmable modules, such as programmable gate arrays or processors. Modules described herein may be implemented as either software and/or hardware modules and may be stored in a storage device. It is to be additionally understood that the data processing elements 132, and the respective components of the present invention that together that comprise the specifically-configured elements, may interchangeably be referred to as "components," "modules," "algorithms" (where appropriate), "engines," "networks," and any other similar term that is intended to indicate an element for carrying out a specific data processing function.

Input data 110 for the agricultural data collection and modeling framework 100 is obtained, according to one embodiment of the present invention, from readings collected from sensors that include radar systems comprised of phased antenna arrays 112. Such phased antenna arrays 112 produce an angular scanning of the horizon without any mechanical rotation of the individual antennas themselves. In addition to sensor data collected from phased antenna arrays 112, input data 110 may also be obtained from other sources. These may include other radar or radar-like systems, such as for example Lidar systems 115 and FMCW systems 116. Input data 110 may also be collected from sensors that include vision-based imaging 117, such as for example a single camera, a stereo camera, and multiple cameras (collecting either still images or video images) or additional from multi-spectral, satellite-based imaging systems. Still other sensors for collecting input data 110 in the present invention may include acoustic sensors 118 and sonic sensors 119. It is to be understood that the agricultural data collection and modeling framework 100 may collect data from phased antenna array 112 sensors that are utilized either alone, or in combination with any other type of sensor.

Input data 110 may also include inertial measurement unit (IMU) data 120 provided by querying inertial measurement units onboard agricultural machinery and other agricultural vehicles. This IMU data 120 may be utilized, as described further herein, in a beamforming operation 150 to determine proper scanning angles 152 for antennas comprising the phased antenna array 112. IMU data 120 represents an orientation of the agricultural machinery relative to the ground, and provides information such as a pitch and a roll of the agricultural machinery. Inertial measurement units that provide such IMU data 120 typically gyroscopes that provide measurements of angular velocity and rotational motion, and accelerometers that measure linear acceleration.

Phased antenna arrays 112 in the agricultural data collection and modeling framework 100 transmit beams of radio waves in an x-band 111 of the radio frequency (RF) spectrum, which is a frequency range in the microwave radio region of the electromagnetic spectrum that is between approximately 7.0 GHz-12 GHz. The x-band frequency range is suitable for sensing soil and penetrating foliage.

The choice of radar frequency also enables penetration of organic matter to determine the true sensor distance to the item of agricultural interest, such as for example where the application involves analyzing soil characteristics. This avoids incorrect sensor readings that measure the distance of matter above the soil surface, which will cause a harvesting head to rise up higher than desired and which means that a crop is not harvested as low to the ground as desired. It also prevents the harvester header from jumping up and down due to matter above the soil surface being present and then not present further along the driving path, which can cause conventional radars to rapidly change the measured distance.

A highly accurate sensor signal for the distance to the ground also allows the harvester head to be set closer to the ground so that the crop can be harvested at the optimal height, without periodically running the header into the soil, which can cause damage to the header and/or get soil into the harvester. Still further advantages of a radar sensor with an array of antennas as compared with the other common sensor types for measuring header height (which is a mechanical feeler) include no moving parts to wear out, and no issues with harvester direction reversing, which can cause mechanical feelers to dig into the ground and cause damage to the sensor.

Phased antenna arrays 112, as noted above, may include analog phase shifters 113 that adjust the phase angle in the beam propagation, or time-delay units that introduce a time delay in the beam propagation. If the antenna uses electronic means to realize the steering or scanning of antenna beam in space, this kind of antenna is called an electronic scanning antenna or an electronically scanned array antenna. In line with the beam scanning method, where the phased antenna array 112 includes analog phase shifters 113, an electronic scanning antenna can be categorized into phase scanning and frequency scanning antennas. Both such antennas may be included in the concept of a phased antenna array.

Regardless, a phased antenna array 112 is composed of multiple antenna elements (radiating elements) arranged in a certain order on a plane or curved surface, as well as signal power distribution/summing network components. If the elements of the phased antenna array 112 are distributed on a plane, it is called planar phased antenna array 112. If they are distributed on a curved surface, the antenna is called curved surface phased antenna array 112. Where the phased antenna array 112 includes analog phase shifters 113, an analog phase shifter 113 is set on each antenna in the phased antenna array 112 to change the phase relationship between the antenna element signals. Under the control of beam steering computers, the phase and amplitude relations between elements of the phased antenna array 112 can be changed, so as to obtain the antenna aperture illumination function corresponding to the required antenna pattern, and to quickly change the direction and shape of the antenna beam. In this manner, the present invention may utilize a phased-array antenna 112 to target specific agricultural attributes to perform measurements relative to items of agricultural interest 174 from particular plant, crop or soil characteristics 172 to be analyzed.

Where the phased antenna array 112 includes true time delay units 114 to accomplish phase shifting, a true time delay unit 114 is set on each antenna in the phased antenna array 112. These true time delay units 114 change the phase relationship between the antenna element signals by introducing delay in the time domain.

Regardless of whether analog phase shifters 113 or true time delay units 114 are utilized, these elements perform phase shifting functions for beams that are both emitted and received by the phased antenna array 112. In other words, beams of radio waves transmitted by the phased antenna array 112, and RF waveforms received by the phased antenna array 112 scattered by the item of agricultural interest 174, are both subject to phase shifting components (analog phase shifters 113 or true time delay units 114).

A phased antenna array 112 includes the following features which are useful in analyzing crop, plant and soil characteristics 172 in a variety of conditions and environments. It can simultaneously search, detect and track multiple objects from different directions and at different heights, and simultaneously perform multi-object search, tracking, acquisition, identification, guiding, control, and victories evaluation. It can reasonably manage and control the main lobe gain, which is conducive to the realization of adaptive side lobe suppression against various disturbances. It has a fast scanning capability which shortens the time required for object signal detection, admission, and information transmission and enables radar with high response speed. The antenna array of phased-array radars is composed of many elements. Even if one or more of the array elements cannot transmit or receive, the performance of the radar as a whole will not be degraded. Therefore, this type of radar is highly reliable.

It is to be understood that while the present invention contemplates, in at least one embodiment thereof, the application of an active phased antenna array, other configurations are also possible. For example, a passive phased antenna array may also be utilized, and is within the scope of the present invention. In an active phased antenna array, (otherwise commonly referred to as an active electronically scanned array, each antenna element has an analog transmitter/receiver module which creates the phase shifting required to electronically steer the antenna beam, and are capable of radiating several beams of radio waves at multiple frequencies in different directions simultaneously. A passive phased antenna array (or passive electronically scanned array) is an alternative configuration in which the antenna elements are connected to a single transmitter and/or receiver.

Returning to FIG. 1, the data processing elements 132 of the agricultural data collection and modeling framework 100 include a data ingest module 140, which ingests, receives, requests, or otherwise obtains input data 110 for subsequent processing. The data processing elements 132 also include a beamforming operation 150, which configures the one or more beam scan angles 152 for the phased antenna array 112. The data ingest module 140 may optionally provide the IMU data 120 for a beamforming operation 150. Where IMU data 120 is used for this beamforming operation 150, it analyzes at least the IMU data 120 to determine orientation of the agricultural machinery relative to the ground, and calculates the scanning angles for the phased antenna array 112 relative to the orientation of the agricultural machinery based on the desired item of agricultural interest 174. This enables allows the agricultural data collection and modeling framework 100 to concentrated transmitted RF energy in a desired direction, allowing for determinations of different features of the environment, or to correct for installation error without mechanical motion of the phased antenna array 112 itself.

The data processing elements 132 also include a beam capture and processing module 160, which initiates an operation to transmit and receive 162 RF energy from the phased antenna array 112. Sensor readings captured from RF energy scattered by the item of agricultural interest 174 are first phase shifted by the phased antenna array 112 to summarize the scattered waveforms as described below with regard to FIG. 2, and then converted by the beam capture and processing module 160, by transforming a horizontal angle φ, a vertical angle θ, and a distance-to-target r into x, y, and z coordinates 164. FIG. 3 illustrates a graphical representation 300 of this conversion. These x, y and z coordinates 164 are then provided to an agricultural model 170 for measuring crop, plant and soil characteristics 172 for analyzing items of agricultural interest 174.

Transforming the horizontal angle φ, the vertical angle θ, and the distance-to-target r into x, y, and z coordinates 164 enables creation of a 3-dimensional point cloud of the item of agricultural interest 174. Further, each point in the point cloud may have a signal response intensity reading that can be interpreted as a measurement of crop, plant, or soil characteristic 172 for the item of agricultural interest 174 sought. Such a 3-dimensional point enables several applications within the present invention as discussed herein. In a generic or general sense, such applications may be considered as allowing for measurement of both a physical shape of an item of agricultural interest 174 or its location relative to other aspects of the surrounding plant, crop, or soil, and for measurement of various other properties of item of agricultural interest 174. More specifically, where the present invention is applied to analyze the physical shape of item of agricultural interest 174, this may be used for example to measure crop, plant and soil characteristics 172 such as how large a grape cluster is, and where it is on a vine. Such an application may also measure a location of a vine cordon or corn stalk. It may also be applied to measure where the soil (or plant, depending on the use case) is relative to the sensor, and roughness of the soil profile. Where the present invention is applied to measure certain properties as crop, plant and soil characteristics 172 to analyze the item of agricultural interest 174, this may include, for example, measuring the soil moisture, measuring a corn stalk density and moisture level, and measuring the amount of water in a grape cluster. These generic applications each involve creating the 3-dimensional point cloud of the "ground truth" and then training an agricultural model 170 based on the knowledge obtained from points in such a point cloud. Where the generic application involves measuring properties, this approach also includes measuring an energy level of a received signal, which is correlated with the property being measured.

Measurements of crop, plant and soil characteristics 172 for items of agricultural interest 174 are generated as output data 180 that may be used in a variety of use cases and applications as noted throughout. In one embodiment of the present invention, output data 180 is provided as instructions to a vehicle controller 181; these instructions may actuate agricultural machinery in some manner to execute a specific agricultural activity. This may include automatically controlling 182 agricultural machinery itself, and automatically positioning 183 such agricultural machinery. It may also include automatically controlling 184 an implement configured with agricultural machinery, and automatically positioning 185 such an implement. Examples of such positioning and control of both agricultural machinery and implements configured with such agricultural machinery are provided herein.

Output data 180 may also be generated as yield data. This may include a crop yield estimate 186, for example representing the estimate fruit yield per tree in an orchard, or the estimated number of grapes on a vine. It may also include actual crop yield 187, representing actual amount of fruit or grapes present. It is to be understood that yields, either estimated yield 186 or actual yield 187, may be generated for any crop or plant, and it is not to be limited to any one type of crop or plant referenced herein.

Figure 2:
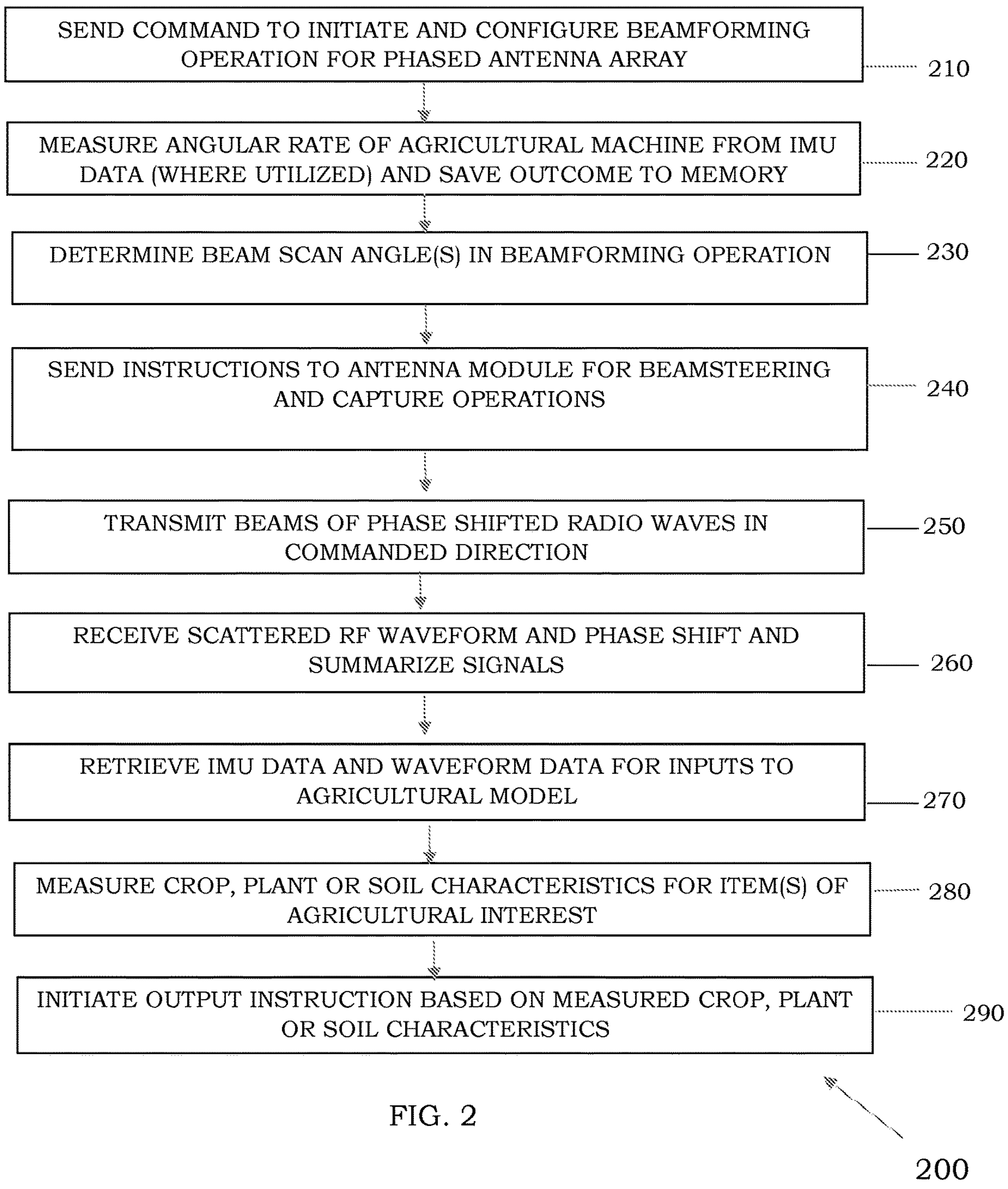
FIG. 2 is a flow chart illustrating a process for performing the agricultural data collection and modeling framework of FIG. 1 according to the present invention.
Figure 3:
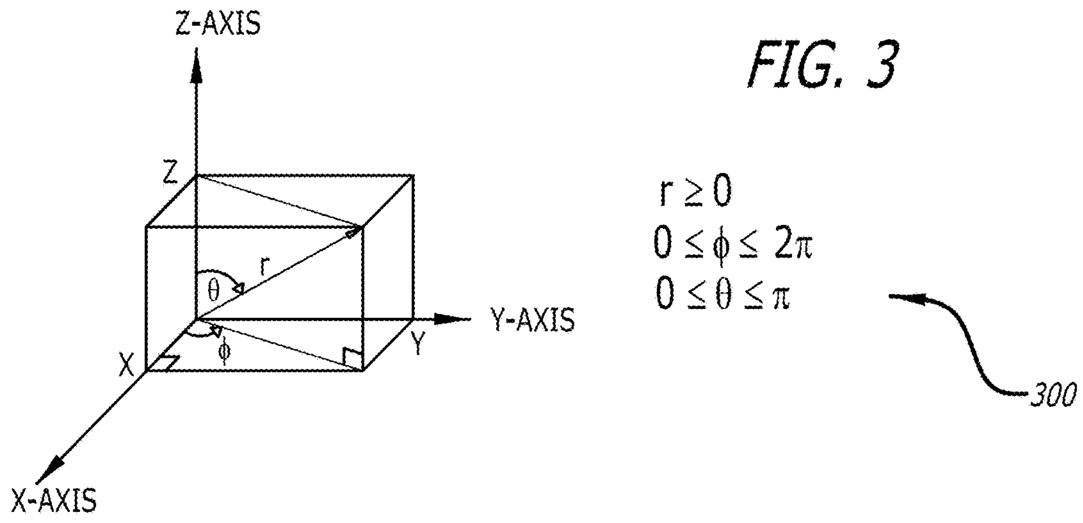
FIG. 3 is a graphical illustration of a transformation of sensor-based positional data into Cartesian coordinates, according to the present invention.

FIG. 2 is a flow chart illustrating a process 200 representing operational steps in performing the agricultural data collection and modeling framework 100. The process 200 initializes the agricultural data collection and modeling framework 100 by sending a command 210 to initiate and configure a beamforming operation 150. This configuration step may optionally include a command to obtain inertial measurement unit data 120 to determine an orientation of agricultural machinery with which a phased antenna array 112 is configured. Where this is the case, the angular rate of the agricultural machine (for example, pitch and roll) is measured at step 220 and this data is saved to memory. At step 230, the process either identifies pre-determined beam scan angles, or calculates revised beam scan angles (where IMU data 120 is utilized) for a beamforming operation 150 relative to an item of agricultural interest 174. The agricultural data collection and modeling framework 100 is ready for substantive data collection to commence.

At step 240 the process 200 communicates one or more instructions to an antenna module controlling the phased antenna array 112 to commence beamsteering and data capture operations. Beams of RF waves that are phase shifted by the phased antenna array 112 are then transmitted at step 250 in the direction of the item of agricultural interest 174 at the scan angle(s) determined at step 230. The process 200 then receives RF waveforms that are scattered back from the item of agricultural interest 174 at step 260. The RF waveforms received by the different antenna elements are phase shifted and then combined either constructively or destructively, depending on their phases. This summarization reinforces signals from a specific direction (beam steering) while attenuating others, effectively in a reverse operation to the beamforming operation 150 that is performed when transmitting the phase shifted beams of radio waves 152. These summarized waveforms representing this scatter are then saved to memory.

At step 270, the process 200 initiates the agricultural model 170 by retrieving data that is necessary for inputs thereto. This may include the IMU data 120, and saved waveform data (both current waveform data, and any past waveform data needed). At step 280, the agricultural model 170 is performed to measure crop, plant and soil characteristics 172 for the item(s) of agricultural interest 174 and generate representative output data 180. At step 290, these measurements are used to initiate instructions for desired output use cases and applications.

It is to be understood that a beamforming operation 150 need not involve analyzing IMU data 120 for each use case or application. A beamforming operation 150 may therefore utilize pre-determined or consistent beam scanning angles 152, and these pre-determined or consistent beam scan angles 152 may be dependent on the use case. Alternatively, determining beam scan angles 152 for a particular use case may involve a first sweep of a general area at a low resolution, and then perform a second or re-sweep of a smaller area at a higher resolution based on what is found in the first sweep.

As noted throughout, many use cases and applications of the agricultural data collection and modeling framework 100 are possible. It is therefore to be understood that multiple use cases and applications in the agricultural sector for the agricultural data collection and modeling framework 100 are contemplated and are within the scope of the present invention.

In one embodiment, and as discussed further below, the agricultural data collection and modeling framework 100 may be applied to tillage, and job quality measurement based on the soil surface roughness, measurement of organic matter above the soil surface, and range measurement from sensor to soil surface. Other use cases involve harvest analytics, and general yield prediction, from modeling crop, plant and soil characteristics 172 such as crop mass and mass flow measurement based on the RF energy scattered, which is a function of organic matter and crop moisture content.

Additional measurements that may be performed within the agricultural data collection and modeling framework 100 include crop moisture content determination for outputs such as yield monitoring systems. The agricultural data collection and modeling framework 100 may also be configured to measure a distance to soil measurement for row unit depth determination.

The agricultural data collection and modeling framework 100 may further be configured to measure residue, soil, and organic matter buildup around a planter or seeder row unit, around a row cleaner on a planter/seeder row unit, and around a planter/seeder row unit's closing wheel(s). The agricultural data collection and modeling framework 100 may be configured to measure furrow depth/width/position determination generally, and when obscured by vegetation, such as during sugar beet harvesting. The agricultural data collection and modeling framework 100 may also be configured to measure a windrow size determination for a mass flow measurement.

Implement and/or machinery-specific applications of the agricultural data collection and modeling framework 100 include measuring a boom height measurement for sprayers, a crop row determination for vehicle or implement steering, a distance-to-soil measurement for harvester head height control, and a determination of a crop edge for guidance of a harvesting machine. The agricultural data collection and modeling framework 100 may also be applied as a harvester tailing monitor to enable working through dust when vision-based sensing is of limiting utility. Still a further application of the agricultural data collection and modeling framework 100 determining a windrow location for machine guidance.

In one exemplary use case, the agricultural data collection and modeling framework 100 is applied to detect a vine cordon location from information in sensor readings collected from by a phased antenna array 112. Vine cordons are extensions from a main trunk of grape vines from which fruiting canes develop, which are often trained to grow in particular directions. Detection of the vine cordon is important for being able to adjust a pruning mechanism relative to the cordon. One difficulty in detecting the cordon is that it is not always visible due to occlusion by the plant's shoots and vegetation.

Figure 4:
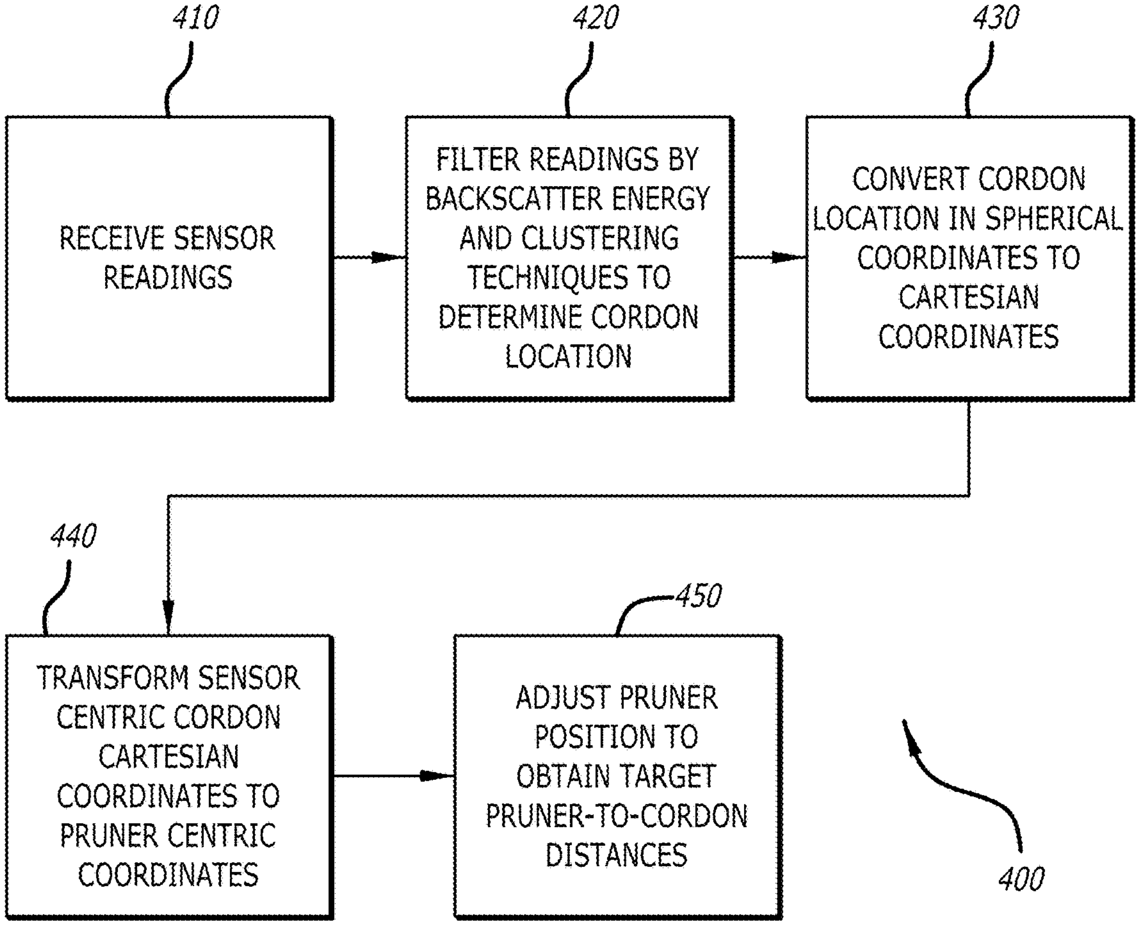
FIG. 4 is a flow chart illustrating a process for a specific agricultural application of the agricultural data collection and modeling framework, according to one embodiment of the present invention.

FIG. 4 is a flow chart illustrating a process 400 involved in a specific agricultural application of the present invention, in which a vine cordon location is being detected using data from sensor readings collected from a phased-array radar. Vine cordons are extensions from a main trunk of grape vines from which fruiting canes develop, which are often trained to grow in particular directions. One issue in detecting the cordon is that it is not always visible due to occlusion by the plant's shoots and vegetation. The use of a phased antenna array 112 in the agricultural data collection and modeling framework 100 of the present invention addresses this issue.

FIG. 4 assumes that prior, pre-processing steps as illustrated in FIG. 2 in steps 210, 220, 230, 240 and 250 have been performed to prepare the agricultural data collection and modeling framework 100 for application in the use case illustrated in FIG. 4. At step 410, the process 400 receives sensor readings in the form of scattered RF waveforms following propagation of phase shifted beams in the direction of the vine cordon. At step 420, the process 400 filters readings by analyzing backscatter energy and applying clustering techniques to determine the cordon location. The cordon location is expressed in spherical coordinates, and these are converted into Cartesian coordinates in step 430. These Cartesian coordinates represent the desired crop, plant and soil characteristics 172 of the item of agricultural interest 174 (the location of the vine cordon).

These crop, plant and soil characteristics 172 are then transformed into a form that may be used by implements of agricultural machinery. The process 400 of FIG. 4 transforms the sensor-centric cordon Cartesian coordinates into pruner-centric coordinates at step 440, to generate output data 180. A pruning device may have horizontal, vertical, or a combination of different pruning cutters. The control of the pruning device can have purely vertical position control, purely horizontal position control, rotational angle control, or a combination of two or more of those methods. At step 450, instructions are issued from this output data 180 to control an implement of agricultural machinery—in this use case, to adjust a pruner position to obtain a desired or targeted pruner-to-cordon distance. The position of the pruner is then automatically adjusted to obtain such desired or targeted pruner-to-cordon distances.

Figure 5:
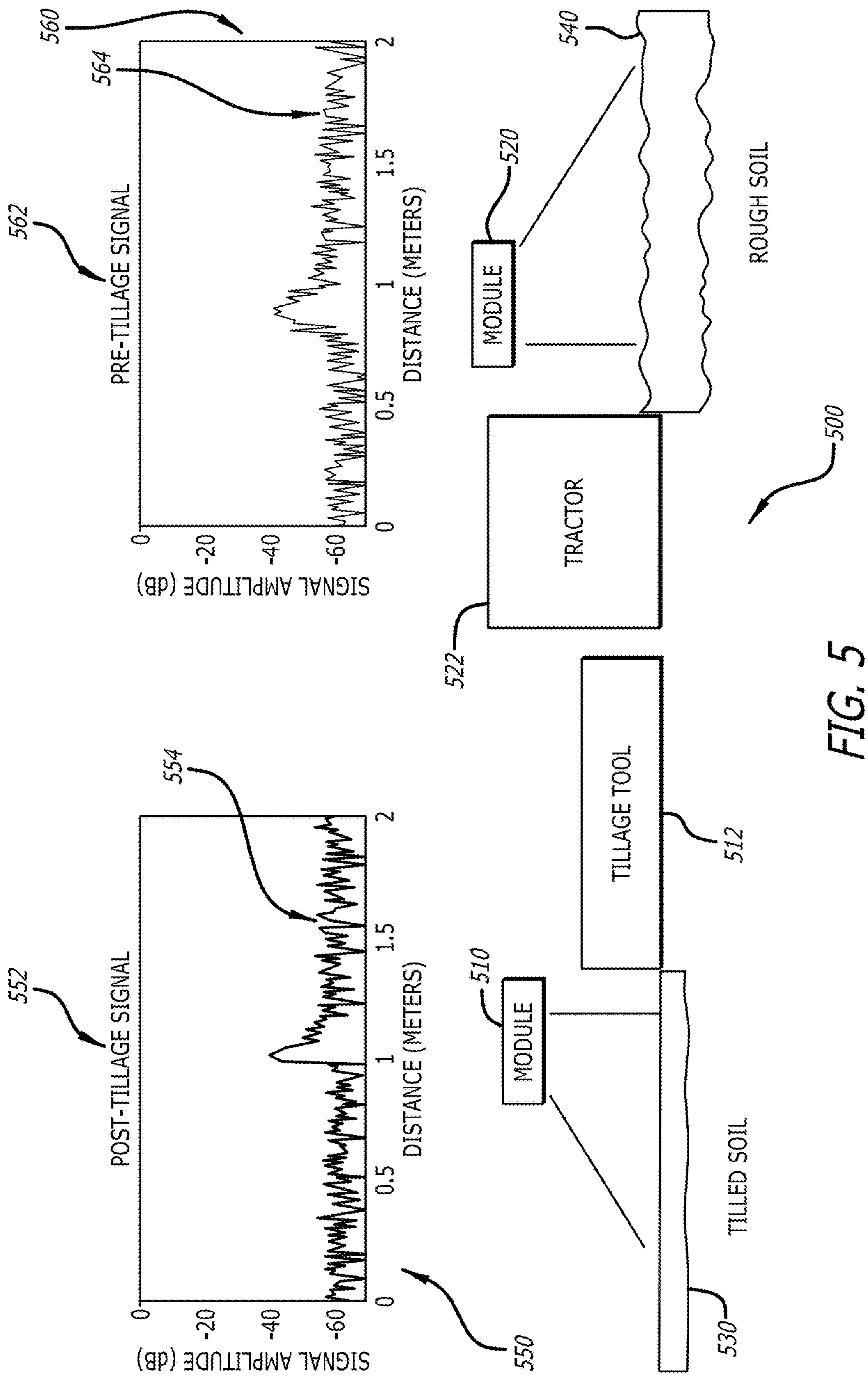
FIG. 5 is an illustration of antenna modules surveying a soil in post-tillage and pre-tillage scenarios, and graphical representations of the signals returned from transmitting beams of radio waves, according to another embodiment of the present invention.

FIG. 5 is an illustration 500 of an antenna module surveying a soil in each of a post-tillage and a pre-tillage scenario, and graphical representations of the signals returned from transmitting phase shifted beams of radio waves. In FIG. 5, phased antenna array modules 510 and 520 transmit phase shifted beams of radio waves. These modules 510 and 520 are mounted to a tillage tool 512 and tractor 522 respectively, to provide real-time measurements of soil roughness. FIG. 5 includes an illustration of a measurement of soil roughness of tilled soil 530 (post tillage), and a measurement of soil roughness of rough soil 540 (pre tillage). Each module 510 and 520 is mounted such that the phased antenna array 112 has an unobstructed view of the soil (the item of agricultural interest 174) to be measured over the scan volume of the phased antenna array 112. The modules 510 and 520 may be placed at different strategic locations of the tillage tool 512 or tractor 522 depending at least in part on a determination of a number of parameters, including but not limited to final tillage job quality across the width of the tillage tool 512, or pre- and post-tillage job quality.

During normal operation, each module 510 and 520 transmits an RF waveform in the direction of the soil. The RF waveform may consist of an unmodulated pulse, a linear-frequency-modulated pulse, a continuous FMCW waveform, or another suitable waveform. During the tillage operation, the modules 510 and 520 may perform a series of beamforming operations to affect where the RF energy is directed, or the modules 510 and 520 may maintain the beam at a given predetermined scan angle.

Each module 510 and 520 may be equipped to communicate with an inertial measurement unit (IMU) to determine the mounting angle of the modules 510 and 520. The IMU data 120 may be used to determine potential beam scan angles for the phased antenna array 112 in each radar module 510 and 520.

The RF energy transmitted by each radar module 510 and 520 illuminates an area of soil and scatters off the soil surface. Receivers of the radar modules 510 and 520 measure the scattered RF energy, and one or more data processing elements 132 in the agricultural data collection and modeling framework 100 determine, based on the return waveform, an approximate level of soil roughness (the desired crop, plant, or soil characteristic 172). This information is plotted in the graphical representation 550 of the post-tillage signal 552, plotted at 554 as signal amplitude versus distance, and the graphical representation 560 of the pre-tillage signal 562, plotted at 564 as signal amplitude versus distance. The agricultural model 170 of the agricultural data collection and modeling framework 100 may utilize one or more approaches to assess the plant, crop, or soil characteristics 172. This may be include analyzing a series of RF ranging measurements over time, applying data points to machine learning-based model trained on prior tillage data, or identifying correlations between measured data and a dataset of prior tillage data, or another method.

In the embodiment of FIG. 5, soil roughness is measured using a phased antenna array 512. Each module 510 and 520 may also perform a real-time distance measurement to ground, and this distance measurement may be determined by a standard ranging technique (e.g. FMCW ranging). The waveform used for the distance measurement may be the same or different from the waveform used for the roughness measurement. If the waveforms are different, the agricultural data collection and modeling framework 100 may issue alternating commands to modules 510 and 520 to perform distance measurements and roughness measurements separately.

Figure 6:
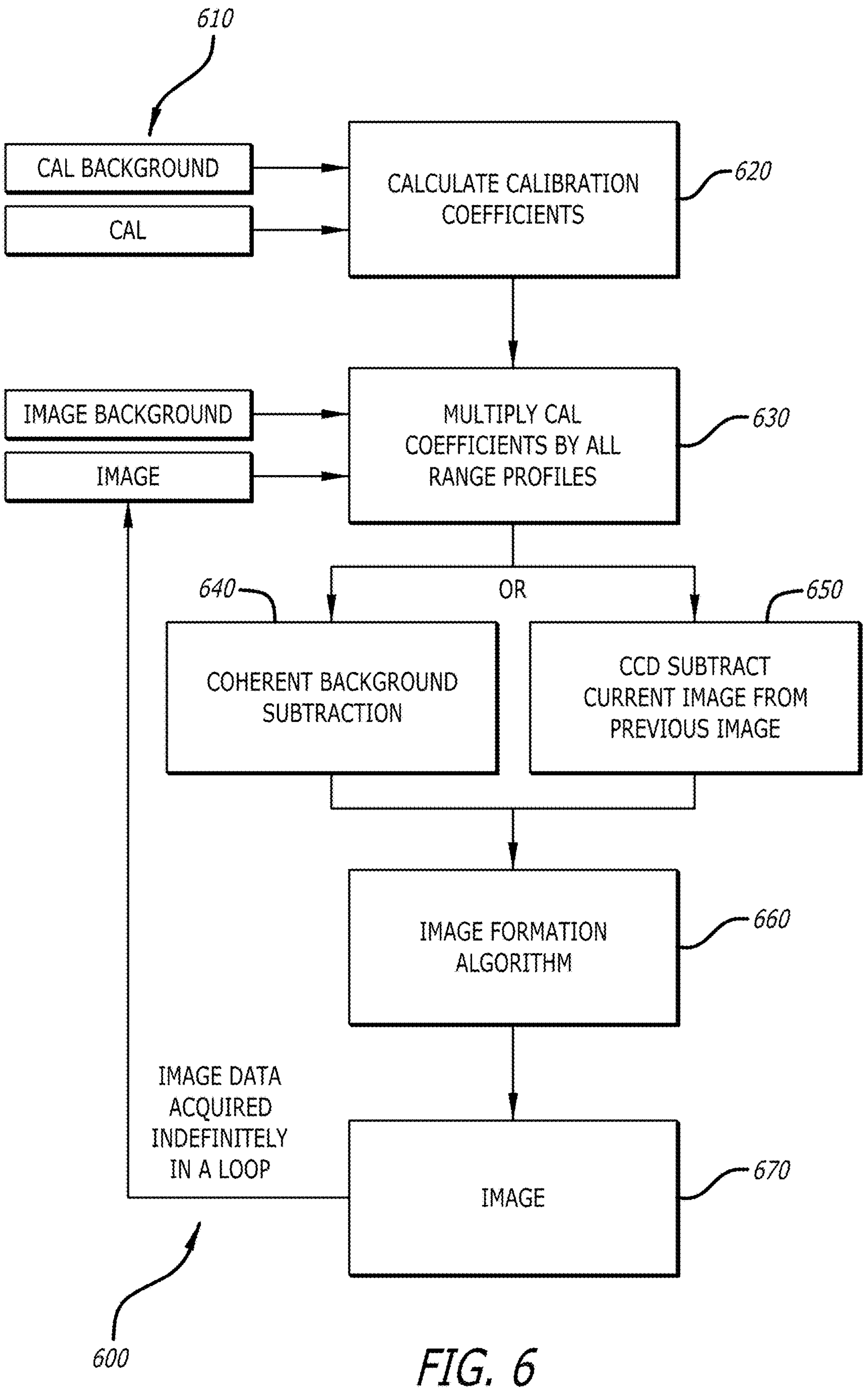
FIG. 6 is a flow chart illustrating a calibration sequence for a phased antenna array in the agricultural data collection and modeling framework, according to a further embodiment of the present invention.

Returning briefly to FIG. 1, the agricultural data collection and modeling framework 100 may also include a calibration module 190 that calibrates at least the phased antenna array 112 for particular use cases or applications. FIG. 6 illustrates various steps in a calibration sequence 600 performed by the calibration module 190 of the agricultural data collection and modeling framework 100. In the embodiment of FIG. 6, the calibration sequence 600 is illustrated for the specific use case detecting a vine cordon location. However, it is to be understood that this sequence 600, and this module 190, may be applied for any use case or application where calibration of the agricultural data collection and modeling framework 100 is desired.

The calibration sequence 600 begins by processing input data for vine cordon detection. In step 610, the sequence 600 calibrates the phased antenna array 112 to the specific application (referred to as "Cal Background" in FIG. 6). This is done by taking measurements with representative plant shoots and vegetation, but with the cordon either not present or, by using one or more algorithms, to eliminate the sensor readings for the cordon, to arrive at calibration coefficients at step 620. The agricultural data collection and modeling framework 100 then multiplies the calibration coefficients by stored range profiles at step 630, and utilizes either coherent background subtraction at step 640, or subtracts a current image from a previous image at step 650 to remove the sensor readings of the shoots and vegetation. The calibration sequence 600 then performs an image formation algorithm at step 660 that highlights the backscatter that is associated with the cordon, and arrives at the image 670 of the cordon.

The calibration sequence 600 may be further described in the context of the use of phased antenna array 112 radar systems as follows. Prior to the commencement of signal measurement, the radar sensor is set to a background measurement mode where no active detection tasks are being executed. This mode captures the raw electromagnetic environment without alterations caused by radar operations. In a background reading measurement mode, the phased antenna array 112 scans the environment and records the electromagnetic signals received across all channels. This data captures a spectrum of ambient electromagnetic noise and other environmental interference that might affect the accuracy of subsequent measurements.

The measured background readings are stored in a memory component within the radar system controlling the phased antenna array 112. This data is preserved as a baseline reference to which all subsequent measurements are compared. During normal operation, when the phased antenna array 112 detects an object or event, the stored background reading data is retrieved, and the agricultural data collection and modeling framework 100 automatically subtracts it from the detected signal. The calibration sequence 600 therefore mitigates the influence of ambient electromagnetic noise and enhances the clarity and accuracy of the measurement.

It is to be understood that the calibration sequence 600 outlined in FIG. 6 may or may not be performed, depending on the item of agricultural interest 174 being modeled. For example, where leaves on a plant are being detected, one difficulty is in calculating not just the number of plant leaves that are visible to the eye, but also the number that are obscured by other leaves. In such a situation, a calibration sequence 600 may or may not be performed since it is the total backscatter from the plant that is being detected. This means that the calibration sequence 600, and calibration module 190, may be pre-performed, or not performed at all.

Therefore, in the present invention, a phased antenna array 112 may be calibrated to a 'normal' or 'acceptable' field condition and looks for changes from the calibrated values for that condition. Alternatively, a phased antenna array 112 may have pre-calibrated levels for sensor readings that correspond to specific field conditions and applications.

It is to be understood that the present invention also contemplates alternatives to phased antenna array radar, and that such alternatives are within the scope thereof. For example, another approach to collection of input data 110 includes use of a switched-array radar system that provides equivalent performance to a synthetic aperture radar (SAR) of the same size, but yet acquires its image in a small fraction of the time. In some circles this type of radar system can also be considered a multiple-input multiple-output (MIMO) device, because it has multiple input and output ports (e.g., array elements).

Unlike conventional MIMO systems that transmit simultaneously and use orthogonal waveforms, this radar transmitter and receiver is time-division multiplexed across the array elements by use of microwave switches. This switching action provides orthogonal excitations that are multiplexed in time rather than transmitted simultaneously with orthogonally coded waveforms. In this example, the S-band range-gated FMCW radar is connected to a switched antenna array system. This radar is capable of chirping from 1.926 GHz to 4.069 GHz at 2.5 ms, 5 ms, and 10 ms, providing chirp rates (cr) of 857 GHz/s, 428 GHz/s, and 214 GHz/s. FMCW radar uses separate transmit and receive antenna elements to minimize transmitter-to-receiver coupling. This technique provides better isolation than using a circulator with a single element because the circulator's performance depends on the reflected power of the element to which it is fed. For example, if the S11 of the element were −20 dB this would offer only 20 dB of isolation. The measured S11s of elements used in this radar vary over the wide bandwidth, but in general each element provides a better than −10 dB S11 between 2 to 4 GHz, dipping as low as −17 dB S11 between 3 and 4 GHz.

Regardless of the number of different types of sensors, or the type of radar system utilized, and as noted above, many different applications and embodiments of the present invention are contemplated. According to one such embodiment, the present invention is an approach for analyzing plant, plant material, crop, soil, and other environment characteristics that impact plant conditions or crop growth, and other items such as trash and other obstacles around plant or crop growth, based on measurements from sensor readings collected from imaging in a phased-array radar system. The agricultural data collection and modeling framework 100 may include performing an estimation or calculation of measurements representing, for example, the shape or properties of an item of interest from modeled plant features, and other crop, plant and soil characteristics 172 from such sensor readings, where the estimation or calculation is based on signals received by the phased antenna array 112.

The agricultural data collection and modeling framework 100 as noted above also generates output data 180 in the form an estimated crop yield 186 or an actual crop yield 187, and other real-time outputs based on the estimated or calculated measurements of the items of interest. This may include recording or transmitting the measurements, and positioning, actuating and adjusting agricultural machinery in response to such measurements.

Examples of measurements of items of agricultural interest 174 (and outputs therefrom) that are possible using the agricultural data collection and modeling framework 100 include the following:

- a vine cordon location, and applying the results obtained from such a measurement to control a location of, and actuation of, a pruning mechanism;
- a vine or tree trunk location, and applying the results obtained from such a measurement to control a location of, and actuation of, a weeding mechanism;
- leaves on a plant, where the amount of leaves on the plant are then compared with a desired amount and a mechanism is positioned and actuated to thin the leaves and/or remove them from the plant;
- a number and/or size of grape clusters on a vine, and applying the results obtained from such a measurement to provide a yield estimation, or determine an actual yield;
- a size and/or count of individual fruits on a plant, including but not limited to strawberries, apples, oranges, lemons, and other crops, and applying the results obtained from such a measurement to provide a yield estimation or determine an actual yield;
- a quantity and/or size of pods on a soybean plant, and applying the results obtained from such a measurement to provide a yield estimation or determine an actual yield;
- an ear size or height on a corn plant, and applying the results obtained from such a measurement to provide a yield estimation or determine an actual yield;
- a cotton stand, evaluated for location and number of items such as stems, branches, leaves, and bolls, and applying results obtained from such measurement to position, actuate, or adjust a mechanism for cleaning the cotton stand of unnecessary items;
- plant height, plant stem width, plant leaf area index, plant tassel presence, and plant tassel location;
- soil and plant matter build-up around a shank, and applying the results obtained from such a measurement to move the shank or other component to reduce the amount of build-up detected;
- soil and plant matter build-up around a row unit, and applying the results obtained from such a measurement to move the row unit or part of the row unit or attachment to the row unit to reduce the amount of build-up detected;
- a location of a plant or multiple plants, and applying the results obtained from such a measurement to identify the row location and heading, and to steer a vehicle or implement relative to the located row;
- a location of a swath of cut grain or grass, and applying the results obtained from such a measurement to automatically steer a vehicle or implement relative to the location;
- a location of the edge of the crop, and applying the results obtained from such a measurement to automatically steer a vehicle or implement relative to the location;
- plant water stress, a crop quality index, corn moisture level;
- average or individual grape sizes within a cluster;
- coffee cherry quality;
- soil moisture level.

Machine Learning Implementations

The data modeling aspects of the agricultural data collection and modeling framework 100 of the present invention may apply one or more layers of machine learning in the machine learning-based models referenced above. The modeling performed in these one or more layers of machine learning may comprise many different types of machine learning, and apply many different mathematical approaches to analyzing information and generating outputs that improve outcomes of the data modeling platform described herein.

Machine learning-based models in the present invention may also include applications of neural networks. Neural networks generally are comprised of nodes, which are computational units having one or more biased input/output connections. Such biased connections act as transfer (or activation) functions that combine inputs and outputs in some way. Nodes are organized into multiple layers that form the neural network. There are many types of neural networks, which are computing systems that "learn" to perform tasks, without being programmed with task-specific rules, based on examples.

Neural networks generally are based on arrays of connected, aggregated nodes (or, "neurons") that transmit signals to each other in the multiple layers over the biased input/output connections. Connections, as noted above, are activation or transfer functions which "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e., decay) over time, as a system learns what weights should be, and how they should be adjusted. In other words, neural networks evolve as they learn, and the mathematical formulas and functions that comprise neural networks design can change over time as a system improves itself.

The application of neural networks within the data modeling aspects of the framework described herein may include instantiations of different networks for different purposes. These include both "production" neural network(s), configured to refine the algorithms performed within the overall modeling framework to generate output data, and "training" neural network(s), configured to train the production network(s) using improvements on the reasons for prior, historical outcomes that have been learned.

Neural networks can also incorporate a time delay, or feedback loop, which is calculated to generally account for temporal dependencies, to further improve the results of the modeling framework. This may be used by a particular type of neural network that accounts for timed data sequences, such as for example the Long-Short-Term-Memory (LSTM) neural network, discussed above. Feedback loops and other time delay mechanisms applied by the various mathematical functions of such a neural network are modeled after one or more temporally-relevant characteristics, and incorporate calculated weights and biases for variables depending on the input data collected and type of problem being analyzed.

Neural networks may be configured to address the problem of decay in longer time-dependent sequences in an architecture that has multiple, interactive components acting as "blocks" in place of the conventional layers of the neural network. Each of these blocks may represent a single layer in that middle layer, or may form multiple layers; regardless, each block may be thought of as representing different timesteps in a time-dependent sequence analysis of input data.

The components of such a specially-focused neural network form its internal state and include a cell, which acts as the memory portion of the block, and three regulating gates that control the flow of information inside each block: an input gate, an output gate, and a forget gate. The cell remembers values over arbitrary time intervals, by keeping track of the dependencies between elements in an input sequence, and the three gates regulate the flow of information into and out of the cell. The input gate controls the extent to which a new value flows into the cell, the forget gate controls the extent to which a value remains in the cell, and the output gate controls the extent to which the value in the cell is used to compute the output of the block. The decision-making function of these gates is often referred to as the logistic sigmoid function for computing outputs of gates in these types of neural networks. There are connections into and out of these gates, and at least the weights of these connections, which need to be learned during training, determine how the gates operate.

Inside neural network blocks, there are additional layers that perform the activation functions needed to ensure that time-dependent data sequences are properly analyzed to avoid decay. One such activation function that may be incorporated is a tanh layer, which effectively classifies input data by determining which input values are added to the internal state of the block. Input gates are a layer of sigmoid-activated nodes whose output is multiplied by inputs classified by preceding tanh layers. The effect of these activation functions is to filter any elements of the inputs that are not required, based on the values assigned to each node for the problem being analyzed, and the weights and biases applied. The weights applied to connections between these nodes can be trained to output values close to zero to switch off certain input values (or, conversely, to pass through other values). Another internal state of a block, the forget gate, is effectively a feedback loop that operates to create a layer of recurrence that further reduces the risk of decay in time-dependent input data. The forget gate helps the neural network learn which state variables should be "remembered" or "forgotten".

Supervised learning is an application of mathematical functions in algorithms that classify input data to find specific relationships or structure therein that allow the machine learning prediction engine to efficiently produce highly accurate output data. There are many types of such algorithms for performing mathematical functions in supervised learning approaches. These include regression analysis (including the logistic regression discussed above, and polynomial regression, and many others), decision trees, Bayesian approaches such as naive Bayes, support vector machines, random forests, anomaly detection, etc.

Neural networks are also a type of such supervised learning approaches, which may also include one or more of the computational techniques in the algorithms described above within their structures. Neural networks are more flexible than regression approaches, and allow for combinations of both structured data (e.g., sensor data) and unstructured data (e.g., observations discerned from social media feeds or direct user input) as inputs to produce the types of outputs desired.

Recurrent neural networks are a name given to types of neural networks in which connections between nodes follow a directed temporal sequence, allowing the neural network to model temporal dynamic behavior and process sequences of inputs of variable length. These types of neural networks are deployed where there is a need for recognizing, and/or acting on, such sequences. As with neural networks generally, there are many types of recurrent neural networks. These include, for example, fully recurrent neural networks, Hopfield networks, bi-directional associative memory networks, echo state networks, neural Turing machines, and many others, all of which exhibit the ability to model temporal dynamic behavior. Any instantiation of such neural networks in the present invention may include one or more of these types, and it is to be understood that neural networks applied within the machine learning prediction engine may include different ones of such types. Therefore, the present invention contemplates that many types of neural networks may be implemented, depending at least on the type of problem being analyzed.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the present invention may have many different configurations of different types of sensing systems, depending for example upon the environment in which sensing is performed, and type of plant, crop, or soil (and/or item of interest) being analyzed. In a further example, the present invention may perform a density analysis by filtering backscatter energy and applying one or more clustering techniques to measure properties of the item of agricultural interest 174. In yet another example, one or more machine learning techniques are applied to create a neural network(s) that takes sensor readings from phased antenna arrays 112 as input, and generate outputs of one or more measurements of the crop, plant and soil characteristics 172 for the item of agricultural interest 174. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A system, comprising:

a phased antenna array;

within a computing environment that includes one or more processors and at least one computer-readable non-transitory storage medium having program instructions stored therein, analyzing one or more plant, crop, and soil characteristics representing an item of agricultural interest and proximate vegetation from information collected by the phased antenna array, by:

directing a plurality of beams of phase shifted radio waves from the phased antenna array at the item of agricultural interest according to one or more beam scan angles identified in a beamforming operation, receiving one or more radio frequency (RF) waveforms scattered from the item of agricultural interest, wherein the one or more RF waveforms are received by the phased antenna array, phase shifted, and combined to reinforce selected waveforms from particular directions while attenuating other non-selected waveforms, transforming the information collected by the phased antenna array in the RF energy scattered from the item of agricultural interest from a horizontal angle, a vertical angle, and a distance-to-target into x, y, and z coordinates of a phased antenna array coordinate frame, measuring the one or more crop, plant and soil characteristics of the item of agricultural interest relative to the phased antenna array, and distinguishing the item of agricultural interest from returns of the one or more RF waveforms representing vegetation, by generating a background representation of the vegetation from the x, y and z coordinates, and subtracting the background representation from subsequently-received returns of the one or more RF waveforms to remove the vegetation and identify the item of agricultural interest, wherein the x, y and z coordinates are transformed into a coordinate frame of an agricultural implement from the coordinate frame of the phased antenna array, and wherein agricultural machinery with which the phased antenna array is configured is actuated to execute an agricultural activity for the item of agricultural interest based on measurements of the one or more crop, plant and soil characteristics, and the agricultural implement is automatically positioned relative to the item of agricultural interest using the coordinate frame to perform the agricultural activity.

2. The system of claim 1, wherein the plurality of phase shifted beams of radio waves are emitted from the phased antenna array, and the one or more RF waveforms are received by the phased antenna array, through an analog phase shifter for each antenna.

3. The system of claim 1, wherein the plurality of beams of phase shifted radio waves are emitted from the phased antenna array, and the one or more RF waveforms are received by the phased antenna array, through a true time delay unit for each antenna.

4. The system of claim 1, wherein the plurality of beams of phase shifted radio waves are transmitted within an x-band of the RF spectrum.

5. The system of claim 1, further comprising a frequency modulated continuous wave radar sensor that collects the information relative to the item of agricultural interest.

6. The system of claim 1, further comprising one or more additional sensing systems that collect the information relative to the item of agricultural interest, wherein the one or more additional sensing systems including at least one of a vision-based imaging system, a light detection and ranging sensor (Lidar), an acoustic sensor, and a sonic sensor.

7. The system of claim 1, further comprising adjusting the beamforming operation, by determining the one or more beam scan angles for the phased antenna array from inertial measurement unit data that indicates an orientation of agricultural machinery on which the phased antenna array is configured, wherein an inertial measurement unit is queried to determine the orientation of the agricultural machinery relative to the ground surface prior to a beamforming operation, the orientation of the agricultural machinery at least represented by a pitch and a roll.

8. The system of claim 1, wherein one or more of a crop yield estimate and an actual crop yield is generated for the item of agricultural interest based on the measurement of the one or more crop, plant and soil characteristics.

9. The system of claim 1, further comprising issuing one or more instructions to automatically position and control the agricultural machinery to execute the agricultural activity in response to the measurement of the one or more crop, plant and soil characteristics.

10. The system of claim 1, further comprising issuing one or more instructions to automatically position and control the agricultural implement of the agricultural machinery to execute the agricultural activity in response to the measurements of the one or more crop, plant, and soil characteristics.

11. A method, comprising:

ingesting input data comprised of sensor data collected by a phased antenna array and representing one or more plant, crop, or soil characteristics representing an item of agricultural interest and proximate vegetation;

analyzing the input data to measure the one or more plant, crop, and soil characteristics and analyze the item of agricultural interest, by:

directing a plurality of beams of phase shifted radio waves from the phased antenna array at the item of agricultural interest according to one or more beam scan angles identified in a beamforming operation, receiving one or more radio frequency (RF) waveforms scattered from the item of agricultural interest, wherein the one or more RF waveforms are received by the phased antenna array, phase shifted, and combined to reinforce selected waveforms from particular directions while attenuating other non-selected waveforms, and transforming the information collected by the phased antenna array in the RF energy scattered from the item of agricultural interest from a horizontal angle, a vertical angle, and a distance-to-target into x, y, and z coordinates of a phased antenna array coordinate frame, measuring the one or more crop, plant and soil characteristics of the item of agricultural interest relative to the phased antenna array, and distinguishing the item of agricultural interest from returns of the one or more RF waveforms representing vegetation, by generating a background representation of the vegetation from the x, y and z coordinates, and subtracting the background representation from subsequently-received returns of the one or more RF waveforms to remove the vegetation and identify the item of agricultural interest, wherein the x, y and z coordinates are transformed into a coordinate frame of an agricultural implement from the coordinate frame of the phased antenna array; and actuating agricultural machinery to execute an agricultural activity for the item of agricultural interest based on measurements of the one or more crop, plant and soil characteristics, wherein the agricultural implement is automatically positioned relative to the item of agricultural interest using the coordinate frame to perform the agricultural activity.

12. The method of claim 11, wherein the plurality of beams of phase shifted radio waves are emitted from the phased antenna array, and the one or more RF waveforms are received by the phased antenna array, through an analog phase shifter for each antenna.

13. The method of claim 11, wherein the plurality of beams of phase shifted radio waves are emitted from the phased antenna array, and the one or more RF waveforms are received by the phased antenna array, through a true time delay unit for each antenna.

14. The method of claim 11, wherein the plurality of beams of phase shifted radio waves are transmitted within an x-band of the RF spectrum.

15. The method of claim 11, wherein the input data further includes sensor data from a frequency modulated continuous wave radar sensor that collects the information relative to the item of agricultural interest.

16. The method of claim 11, wherein the input data further includes sensor data from one or more additional sensing systems that collect the information relative to the item of agricultural interest, wherein the one or more additional sensing systems including at least one of a vision-based imaging system, a light detection and ranging sensor (Lidar), an acoustic sensor, and a sonic sensor.

17. The method of claim 11, further comprising adjusting the beamforming operation, by querying an inertial measurement unit to determine an orientation of the agricultural machinery relative to the ground surface prior to the beamforming operation, the orientation of the agricultural machinery at least represented by a pitch and a roll, and determining the one or more beam scan angles for the phased antenna array from inertial measurement unit data that indicates the orientation of the agricultural machinery on which the phased antenna array is configured.

18. The method of claim 11, wherein one or more of a crop yield estimate and an actual crop yield is generated for the item of agricultural interest based on the measurement of the one or more crop, plant and soil characteristics.

19. The method of claim 11, wherein the actuating the agricultural machinery further comprises issuing one or more instructions to automatically position and control the agricultural machinery to execute the agricultural activity in response to the measurement of the one or more crop, plant and soil characteristics.

20. The method of claim 11, wherein the actuating the agricultural machinery further comprises issuing one or more instructions to automatically position and control the agricultural implement to execute the agricultural activity in response to the measurements of the one or more crop, plant and soil characteristics.

21. A method, comprising:

configuring a beamforming operation, by identifying one or more beam scan angles for a phased antenna array configured with agricultural machinery;

performing the beamforming operation, the beamforming operation including capturing sensor data from the phased antenna array, by transmitting a plurality of beams of radio waves from the phased antenna array at the item of agricultural interest according to the one or more beam scan angles, and receiving one or more radio frequency (RF) waveforms scattered from the item of agricultural interest, wherein the plurality of beams of radio waves are phase shifted, and the one or more RF waveforms are received by the phased antenna array, phase shifted, and combined to reinforce selected waveforms from particular directions while attenuating other non-selected waveforms;

transforming the sensor data from a horizontal angle, a vertical angle, and a distance-to-target into x, y, and z coordinates of a phased antenna array coordinate frame;

measuring one or more crop, plant and soil characteristics of the item of agricultural interest and surrounding vegetation relative to the phased antenna array;

distinguishing the item of agricultural interest from returns of the one or more RF waveforms representing vegetation, by generating a background representation of the vegetation from the x, y and z coordinates, and subtracting the background representation from subsequently-received returns of the one or more RF waveforms to remove the vegetation and identify the item of agricultural interest, wherein the x, y and z coordinates are transformed into a coordinate frame of an agricultural implement from the coordinate frame of the phased antenna array; and instructing the agricultural machinery to execute an agricultural activity for the item of agricultural interest based on measurements of the one or more crop, plant and soil characteristics, wherein the agricultural implement is automatically positioned relative to the item of agricultural interest using the coordinate frame to perform the agricultural activity.

22. The method of claim 21, wherein the plurality of beams of radio waves are emitted from the phased antenna array, and the one or more RF waveforms are received by the phased antenna array, through an analog phase shifter for each antenna.

23. The method of claim 21, wherein the plurality of beams of radio waves are emitted from the phased antenna array, and the one or more RF waveforms are received by the phased antenna array, through a true time delay unit for each antenna.

24. The method of claim 21, wherein the plurality of beams of radio waves are transmitted within an x-band of the RF spectrum.

25. The method of claim 21, wherein the capturing sensor data further comprises capturing data from a frequency modulated continuous wave radar sensor that collects the information relative to the item of agricultural interest.

26. The method of claim 21, wherein the capturing sensor data further includes capturing data from one or more additional sensing systems that collect the information relative to the item of agricultural interest, wherein the one or more additional sensing systems including at least one of a vision-based imaging system, a light detection and ranging sensor (Lidar), an acoustic sensor, and a sonic sensor.

27. The method of claim 21, wherein the configuring the beamforming operation further comprises querying an inertial measurement unit to determine an orientation of the agricultural machinery relative to the ground surface prior to the beamforming operation, the orientation of the agricultural machinery at least represented by a pitch and a roll, wherein the beamforming operation is adjusted based on inertial measurement unit data that indicates the orientation of the agricultural machinery on which the phased antenna array is configured.

28. The method of claim 21, further comprising generating one or more of a crop yield estimate and an actual crop yield is generated for the item of agricultural interest based on the measurement of the one or more crop, plant and soil characteristics.

29. The method of claim 21, wherein the instructing the agricultural machinery further comprises issuing one or more instructions to automatically position and control the agricultural machinery to execute the agricultural activity in response to the measurement of the one or more crop, plant and soil characteristics.

30. The method of claim 21, wherein the instructing the agricultural machinery further comprises issuing one or more instructions to automatically position and control the agricultural implement to execute the agricultural activity in response to the measurements of the one or more crop, plant and soil characteristics.

* * * * *